(12) United States Patent
Dods et al.

(10) Patent No.: US 8,810,541 B2
(45) Date of Patent: *Aug. 19, 2014

(54) HANDHELD ELECTRONIC DEVICE HAVING GESTURE-BASED CONTROL AND A METHOD OF USING SAME

(71) Applicant: BlackBerry Limited, Waterloo (CA)

(72) Inventors: Jeffrey Alton Hugh Dods, Waterloo (CA); Jason Griffin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,556

(22) Filed: Aug. 23, 2013

(65) Prior Publication Data

US 2013/0342447 A1 Dec. 26, 2013

Related U.S. Application Data

(63) Continuation of application No. 12/391,348, filed on Feb. 24, 2009, now Pat. No. 8,547,326.

(51) Int. Cl.
*G06F 3/041* (2006.01)

(52) U.S. Cl.
USPC .......................................... 345/173; 345/156

(58) Field of Classification Search
None
See application file for complete search history.

(56) References Cited

U.S. PATENT DOCUMENTS

| 6,002,808 | A | 12/1999 | Freeman |
| 6,347,290 | B1 | 2/2002 | Bartlett |
| 6,369,794 | B1 | 4/2002 | Sakurai et al. |
| 6,703,550 | B2 | 3/2004 | Chu |
| 7,333,090 | B2 | 2/2008 | Tanaka et al. |
| 7,365,736 | B2 | 4/2008 | Marvit et al. |
| 2002/0167699 | A1 | 11/2002 | Verplaetse et al. |
| 2005/0212749 | A1 | 9/2005 | Marvit et al. |
| 2005/0253806 | A1 | 11/2005 | Libertyt et al. |
| 2006/0017692 | A1 | 1/2006 | Wehrenberg et al. |
| 2007/0259685 | A1 | 11/2007 | Engblom et al. |
| 2007/0268246 | A1 | 11/2007 | Hyatt |
| 2008/0008440 | A1 | 1/2008 | Shore et al. |

FOREIGN PATENT DOCUMENTS

WO 2007072117 A 6/2007

OTHER PUBLICATIONS

Perry, Kyle, "An Apple a Day Keeps the Doctor Away: Apple Unveils New iPods", The Claw, Oct. 31, 2008, Internet URL:http://cougar.slvhs.slv.k12.ca.us/claw/oct/page%207.pdf.
European Patent Office, "Extended European Search Report" for corresponding European Patent Application No. 09153508.8 dated Aug. 11, 2009.
European Patent Office, "Communication Pursuant to Article 94(3) EPC" for corresponding European Patent Application No. 09153508.8 dated Apr. 30, 2012.
Popa, Cristian—Canadian Intellectual Property Office, "Examiner's Requisition" for corresponding Canadian Patent Application No. 2,694,742 dated May 16, 2012.
Popa, Cristian—Canadian Intellectual Property Office, "Examiner's Requisition" for Canadian Patent Application No. 2,694,742 dated Jan. 9, 2014.

*Primary Examiner* — Adam R Giesy
(74) *Attorney, Agent, or Firm* — Ridout & Maybee LLP

(57) ABSTRACT

The present disclosure describes a handheld electronic device having a gesture-based control and a method of using the same. In one embodiment, there is provided a method, comprising: determining from a motion signal a movement type associated with a movement of the electronic device from a number predetermined types of movement; determining whether a cadence parameter is greater than or equal to a first cadence reference level, wherein the cadence parameter is dependent on the movement type; performing a first command when the cadence parameter is greater than or equal to the first cadence reference level; and performing a second command is performed when the cadence parameter is less than the first cadence reference level.

15 Claims, 10 Drawing Sheets

HANDHELD ELECTRONIC DEVICE HAVING GESTURE-BASED CONTROL AND A METHOD OF USING SAME

CROSS-REFERENCE TO RELATED APPLICATIONS

This application is a continuation of U.S. patent application Ser. No. 12/391,348, filed Feb. 24, 2009, the content of which is incorporated herein by reference.

TECHNICAL FIELD

The present disclosure relates generally to input devices, and more particularly to a handheld electronic device having gesture-based control and a method of using same.

BACKGROUND

Handheld electronic devices are sometimes equipped with motion sensors which can be used to detect predetermined motions or gestures made with the handheld electronic device. Examples of motion and gesture-based controls which have been suggested in the context of handheld electronic devices are the ability to disable or modify a telephone ringer in accordance with the detection of a predetermined action such as tapping the handheld electronic device. However, the incorporation of gesture-based controls in handheld electronic devices is still relatively limited. Gesture-based device control is still developing as motion sensors become more sensitive and the processing power and ability for handheld electronic devices to perform more complex motion and gesture analysis improves. Thus, there remains a need for improved handheld electronic devices having gesture-based control.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
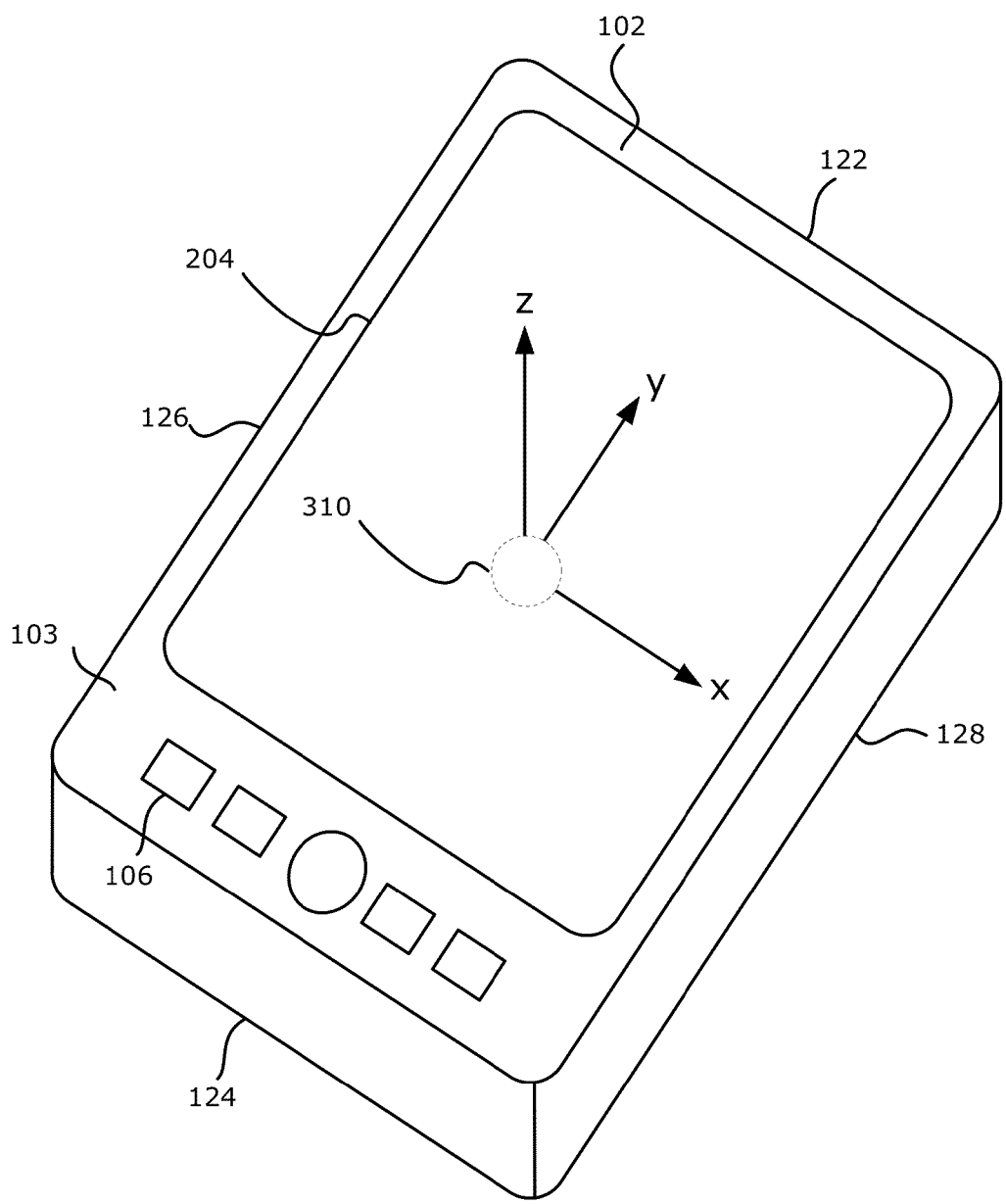
FIG. 1 is a perspective view of a handheld electronic device having a motion detection subsystem in accordance with one embodiment of the present disclosure.

The present disclosure describes a handheld electronic device having a gesture-based control mechanism and a method of using the same. The cadence of detected movements of one or more predetermined types is interpreted as an input used to control the handheld electronic device. The cadence may be determined as a rhythm of the detected movement. In some embodiments, the gesture-based controls have an associated cadence such as a rate of reproduction. In other embodiments, the gesture-based controls do not have an associated cadence. In some embodiments, the present disclosure provides a method for gesture-based control of media production on the device.

In accordance with one embodiment of the present disclosure, there is provided a method, comprising: determining from a motion signal a movement type associated with a movement of the electronic device from a number predetermined types of movement; determining whether a cadence parameter is greater than or equal to a first cadence reference level, wherein the cadence parameter is dependent on the movement type; performing a first command when the cadence parameter is greater than or equal to the first cadence reference level; and performing a second command is performed when the cadence parameter is less than the first cadence reference level.

In accordance with another embodiment of the present disclosure, there is provided a method, comprising: determining a rate of movement of an electronic device; increasing a rate of reproduction of media when the rate of movement is greater than or equal to a first threshold; and decreasing the rate of reproduction of media when the rate of movement is less than the first threshold.

In accordance with a further embodiment of the present disclosure, there is provided a method, comprising: determining a rate of movement of an electronic device; increasing a rate of reproduction of media when the rate of movement is greater than or equal to a first threshold; and decreasing the rate of reproduction of media when the rate of movement is less than the first threshold.

In accordance with yet a further embodiment of the present disclosure, there is provided a method of controlling a handheld electronic device, comprising: receiving a motion signal as input from a motion detection subsystem in response to a movement of the device; determining from the motion signal a cadence parameter associated with the movement of the electronic device; determining whether the cadence parameter is greater than or equal to a cadence reference level; performing a first command when the cadence parameter is greater than or equal to the cadence reference level; and performing a second command when the cadence parameter is less than the cadence reference level.

In accordance with yet a further embodiment of the present disclosure, there is provided a handheld electronic device, comprising: a controller for controlling the operation of the device; and a motion detection subsystem connected to the controller which generates a motion signal in response to a movement of the electronic device; the controller being configured for receiving a motion signal as input from a motion detection subsystem in response to a movement of the device, determining from the motion signal a cadence parameter associated with the movement of the electronic device, determining whether the cadence parameter is greater than or equal to a cadence reference level, performing a first command when the cadence parameter is greater than or equal to the cadence reference level, and performing a second command when the cadence parameter is less than the cadence reference level.

In accordance with yet further embodiments of the present disclosure, there is provided a computer program product comprising a computer readable medium having stored thereon computer program instructions for implementing a method on a handheld electronic device for controlling its operation, the computer executable instructions comprising instructions for performing the method(s) set forth herein.

The embodiments described herein generally relate to portable electronic devices. Examples of portable electronic devices include mobile (wireless) communication devices such as pagers, cellular phones, Global Positioning System (GPS) navigation devices and other satellite navigation devices, smartphones, wireless organizers or personal digital assistants (PDA) and wireless-enabled notebook computers. At least some of these portable electronic devices may be handheld electronic devices. The portable electronic device may be a handheld electronic device without wireless communication capabilities such as a PDA, electronic gaming device, digital photograph album or picture frame, digital camera, or digital video recorder such as a camcorder. The portable electronic device may comprise a touchscreen display, a mechanical keyboard, or both a touchscreen display and a mechanical keyboard. These examples are intended to be non-limiting.

Figure 2:
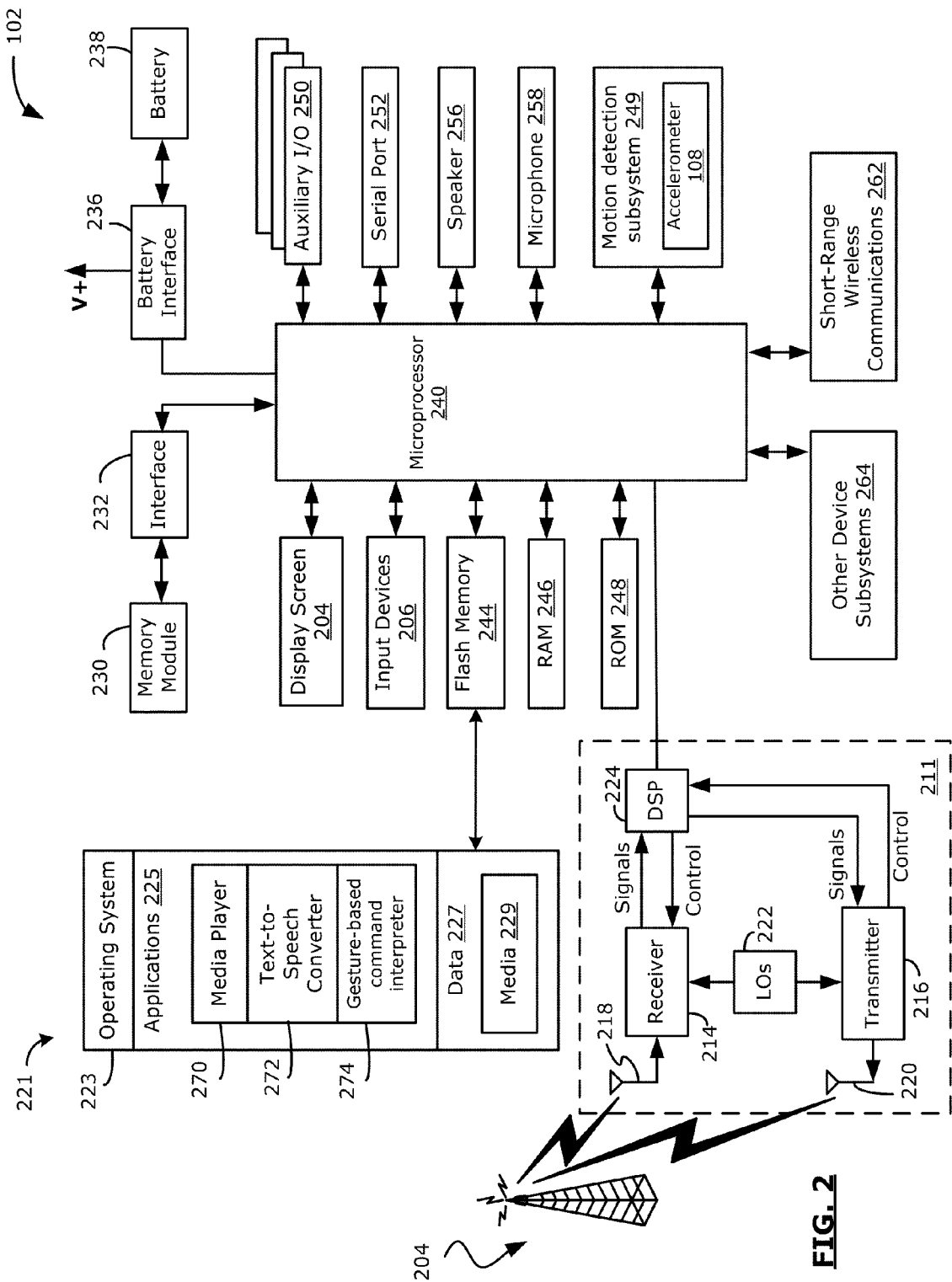
FIG. 2 is a block diagram illustrating a handheld electronic device in which example embodiments of the present disclosure can be applied.

Reference is first made to FIGS. 1 and 2 which illustrates an example electronic device 102 in which embodiments of the present disclosure may be applied. In this example embodiment, the electronic device 102 is a handheld electronic device 102 having two-way communication capabilities such as, for example, data communication capabilities, voice communication capabilities or the capability to communicate with other computer systems, for example, via the Internet. The handheld electronic device 102 is sometimes referred to as a mobile communication device.

The handheld electronic device 102 includes a controller comprising at least one microprocessor 240 which controls the overall operation of the handheld electronic device 102. The microprocessor 240 interacts with device subsystems including a display screen 204 such as a liquid crystal display (LCD), one or more input devices 206, a wireless communication subsystem 211 which performs communication functions and exchanges radio frequency signals with a wireless network 204, flash memory 244, random access memory (RAM) 246, read only memory (ROM) 248, auxiliary input/output (I/O) subsystems 250, data port 252 such as serial data port such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions. It will be appreciated that other device configurations are also possible and that not all electronic devices to which methods according to the present application may be applied will have all of the elements described above.

The handheld electronic device 102 includes a rigid case 103 for housing the components of the handheld electronic device 102. The rigid case 103 is configured to be held in a user's hand while the handheld electronic device 102 is in use. In the embodiment shown in FIG. 1, the case 103 is elongate having a length greater than its width. The case 103 has opposed top and bottom ends designated by references 122, 124 respectively, and two left and right sides extending transverse to the top and bottom ends 122, 124, designated by references 126, 128 respectively. Although the case 103 is shown as a single unit, it could, among other possible configurations, include two or more case members hinged together (such as, for example, a flip-phone configuration or a clam shell-style laptop computer). Other device configurations are also possible.

The input devices 206 may take a variety of forms. For example, in some embodiments, the input devices 206 may comprise any combination of a keyboard, control buttons and a navigation device such as a rotatable and depressible ("clickable") thumbwheel or scroll wheel, or a depressible ("clickable") rolling member or trackball. In the shown embodiment, the input devices 206 are positioned towards the bottom end 124 of the handheld electronic device 102 for actuation by the thumbs or other fingers off the device user while it is being held in one or two hands, depending on the embodiment. In other embodiments, the input devices 206 may be located elsewhere, for example the control buttons may be located on the top end 122 or any side of the device 102, and a scroll wheel may be located on a side of the device 102 for convenient thumb scrolling by the hand in which the device 102 is held.

In some embodiments, the display screen 204 may be a touchscreen display which also acts both as a display device and an input device 206. The touchscreen display may be constructed using a touch-sensitive input surface connected to an electronic controller and which overlays the display screen 204. The touch-sensitive overlay and the electronic controller provide a touch-sensitive input device and the microprocessor 240 interacts with the touch-sensitive overlay via the electronic controller.

Figure 3:
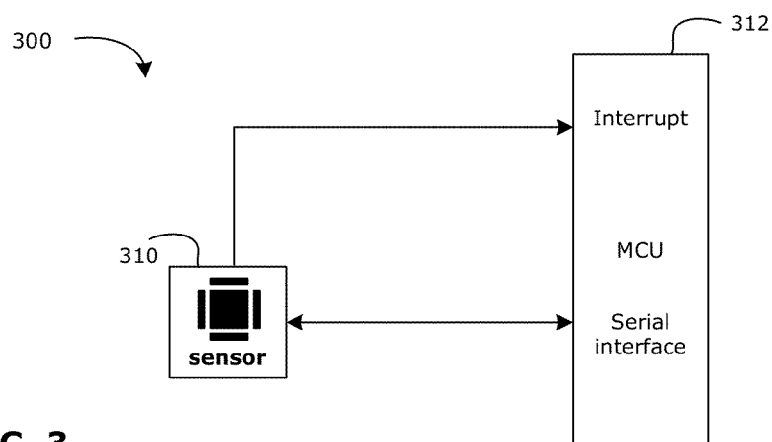
FIG. 3 is a block diagram of a device orientation detection subsystem comprising a digital 3-axis accelerometer in accordance with one example embodiment of the present disclosure.

The handheld electronic device 102 also comprises motion detection subsystem 249 comprising at least one sensor which is connected to the microprocessor 240 and which is controlled by one or a combination of a monitoring circuit and operating software. The sensor has a sensing element which detects acceleration from motion and gravity. The sensor generates and outputs an electrical signal representative of the detected acceleration. Changes in movement of device 102 results in changes in acceleration which produce corresponding changes in the electrical signal output of the sensor. In at least some embodiments, the sensor is an accelerometer 310 (FIG. 3). Accelerometers have one, two or three sensing axes. In at least some embodiments, the accelerometer is a three-axis accelerometer having three mutual orthogonally sensing axes. It will be appreciated by one skilled in the art that accelerometer having a different number of sensing axes and other types of motion sensors may also be used by the motion detection subsystem 249 in other embodiments.

As will also be appreciated by persons skilled in the art, accelerometers may produce digital or analog output signals. Generally, two types of outputs are available depending on whether an analog or digital accelerometer used: (1) an analog output requiring buffering and analog-to-digital (A/D)

conversion; and (2) a digital output which is typically available in an industry standard interface such as an SPI (Serial Peripheral Interface) or I2C (Inter-Integrated Circuit) interface.

The output of an accelerometer is typically measured in terms of the gravitational acceleration constant at the Earth's surface, denoted g, which is approximately 9.81 m/s$^2$ (32.2 ft/s$^2$) as the standard average, or in terms of units Gal (cm/s$^2$). The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland. Example low-g MEMS accelerometers are model LIS331DL, LIS3021DL and LIS3344AL accelerometers from STMicroelectronics N.V. The LIS3344AL model is an analog accelerometer with an output data rate of up to 2 kHz which has been shown to have good response characteristics in analog sensor based motion detection subsystems.

Referring briefly to FIG. 3, an example motion detection subsystem 249 in accordance with one example embodiment of the present disclosure will be described. The circuit 300 comprises a digital 3-axis accelerometer 310 connected to the interrupt and serial interface of a controller (MCU) 312. The controller 312 could be the microprocessor 240 of the device 102. The operation of the controller 312 is controlled by software, which may be stored in internal memory of the controller 312. The operational settings of the accelerometer 310 are controlled by the controller 312 using control signals sent from the controller 312 to the accelerometer 310 via the serial interface. The controller 312 may analyze the detected movement in accordance with the acceleration measured by the accelerometer 310, or raw acceleration data measured by the accelerometer 310 may be sent to the microprocessor 240 of the device 102 via its serial interface where the detected movement is analyzed by a gesture-based command interpreter 274, operating system 223 or other software module 221. In other embodiments, a different digital accelerometer configuration could be used, or a suitable analog accelerometer and control circuit could be used.

Referring again to FIG. 1, the motion detection subsystem 249 is shown located within the handheld electronic device 102. As illustrated in FIG. 1, the accelerometer 310 includes three mutual orthogonally sensing axes denoted x, y and z which are aligned with the form factor of the device 102. In some embodiments, the accelerometer 310 is aligned such that a first sensing axis (e.g., the x-axis) extends longitudinally between left and right sides 126, 128 of the handheld electronic device 102, a second sensing axis (e.g., the y-axis) extends laterally between top and bottom ends 122, 124, and a third sensing axis (e.g., the z-axis) extends perpendicularly through the x-y plane defined by the x and y axes at the intersection (origin) of these axes. In such a configuration, when the device 102 is oriented on a flat horizontal surface such as a table, the x and y axes are parallel to the table and the z axis has the force of gravity operating directly upon it. It is contemplated that the sensing axes x, y, z could be aligned with different features of the electronic device 102 in other embodiments.

The motion detection subsystem 249 produces an electrical motion signal (referred to as a motion signal) which represents the acceleration detected by the accelerometer 310, for example, in response to the movement of the handheld electronic device 102. As will be described in greater detail below, the signal produced by the motion detection subsystem 249 may be used to determine a type of movement of the device 102, a cadence of that movement, or both. As explained more fully below, the microprocessor 240 under the instruction of the gesture-based command interpreter 274, operating system 223 and/or an application 225 on the device 102 may interpret the cadence of detected movement as a command/instruction, possibly in combination with the type of movement of the device (e.g., a shaking movement or other movement).

The handheld electronic device 102 may provide a graphical user interface (GUI) on the display screen 204 for controlling the operation of the device 102. The GUI may allow operational aspects of a gesture-based command interpreter 274 (FIG. 2) to be defined or set by the device user. As per typical GUIs, the device user may cause a menu to be displayed on the display screen 204 having a number of menu item items which can be selected. The GUI may, in some embodiments, permit the device user to configure the cadence parameters associated with specific commands, possibly in combination with the type of movement.

Referring again to FIG. 2, the microprocessor 240 operates under stored program control and executes software modules 221 stored in memory such as persistent memory, for example, in the flash memory 244. As illustrated in FIG. 2, the software modules 221 comprise operating system software 223 and software applications 225 including a media player 270 for media playback through the display screen 204 and/or speaker 256, a text-to-speech converter 272 for converting written text into audible, spoken words which are playable through the speaker 256, and a gesture-based command interpreter 274 for determining an input or command associated with a cadence of movement of the device 102 detected by the motion detection system 249 or determined from motion signals output therefrom. Media 229 is also provided either stored in embedded memory such as the flash memory 244 or a removable memory card such as a Secure Digital™ (SD) card or micro SD™ card, or Compact Flash™ card, or streamed over a wireless network 101.

The media player 270 may take various forms, depending on the type of media 229. For example, in various embodiments, the media player 270 may be a video player, an audio player, an image view, a slideshow player, or any combination thereof. The specific hardware used to reproduce the media 229 upon depends on the type of the media 229 and the configuration of the device 102 and the type of media it is capable of reproducing. For example, while the device 102 described includes both a display screen 104 for reproduction visual content and a speaker 256 for reproducing audio content, in other embodiments the device 102 may have only one of these media output devices.

The media player 270, text-to-speech converter 272, command interpreter 274 may, among other things, be implemented through a stand-alone software application, or combined together in one or more of the operating system 223 and applications 225. In some example embodiments, the functions performed by each of the media player 270, text-to-speech converter 272, command interpreter 274 may be realized as a plurality of independent elements, rather than single integrated elements, and any one or more of these elements may be implemented as parts of other software applications 225. Furthermore, in some embodiments, at least some of the functions performed by any one of the media player 270, text-to-speech converter 272 and command interpreter 274 may be implemented in firmware of the handheld electronic device 102.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software modules 221 may also include a range of other applications not specifically shown in FIG. 2 including, for example, any one or a combination of an address book application, a messaging application, a calendar application, and a notepad application. In some embodiments, the software modules 221 include one or more of a Web browser application (i.e., for a Web-enabled mobile communication device 200), an email message application, a push content viewing application, a voice communication (i.e. telephony) application and a mapping application. The software modules 221 may include layout information defining the placement of particular fields and graphic elements (e.g. text fields, input fields, icons, etc.) in the user interface (i.e. the display screen 204) according to the application.

In some embodiments, the auxiliary input/output (I/O) subsystems 250 may comprise an external communication link or interface; for example, an Ethernet connection. The handheld electronic device 102 may comprise other wireless communication interfaces for communicating with other types of wireless networks; for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the handheld electronic device 102 such as receipt of an electronic communication or incoming phone call, or for other purposes such as haptic feedback.

In some embodiments, the handheld electronic device 102 also includes a removable memory card 230 (typically comprising flash memory) and a memory card interface 232. Network access is typically associated with a subscriber or user of the handheld electronic device 102 via the memory card 230, which may be a Subscriber Identity Module (SIM) card for use in a GSM network or other type of memory card for use in the relevant wireless network type. The memory card 230 is inserted in or connected to the memory card interface 232 of the handheld electronic device 102 in order to operate in conjunction with the wireless network 204.

The handheld electronic device 102 stores data 227 in an erasable persistent memory, which in one example embodiment is the flash memory 244. In various embodiments, the data 227 may include service data comprising information required by the handheld electronic device 102 to establish and maintain communication with the wireless network 204. The data 227 may also include user application data such as email messages, address book and contact information, calendar and schedule information, notepad documents, image files, and other commonly stored user information stored on the handheld electronic device 102 by its user, and other data. The data 227 stored in the persistent memory (e.g. flash memory 244) of the handheld electronic device 102 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the handheld electronic device 102 by providing for information or software downloads to the handheld electronic device 102 other than through the wireless network 204. The alternate download path may, for example, be used to load an encryption key onto the handheld electronic device 102 through a direct, reliable and trusted connection to thereby provide secure device communication.

The handheld electronic device 102 may also include a battery 238 as a power source, which may be one or more rechargeable batteries that may be charged, for example, through charging circuitry coupled to a battery interface such as the serial data port 252. The battery 238 provides electrical power to at least some of the electrical circuitry in the handheld electronic device 102, and the battery interface 236 provides a mechanical and electrical connection for the battery 238. The battery interface 236 is coupled to a regulator (not shown) which provides power V+ to the circuitry of the handheld electronic device 102.

The short-range communication subsystem 262 is an additional optional component which provides for communication between the handheld electronic device 102 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices (Bluetooth® is a registered trademark of Bluetooth SIG, Inc.).

A predetermined set of applications that control basic device operations, including data and possibly voice communication applications may be installed on the handheld electronic device 102 during or after manufacture. Additional applications and/or upgrades to the operating system 221 or other software modules 221 may also be loaded onto the handheld electronic device 102 through the wireless network 204, the auxiliary I/O subsystem 250, the serial port 252, the short-range communication subsystem 262, or other suitable subsystem 264 other wireless communication interfaces. The downloaded programs or code modules may be permanently installed, for example, written into the program memory (i.e. the flash memory 244), or written into and executed from the RAM 246 for execution by the microprocessor 240 at runtime. Such flexibility in application installation increases the functionality of the handheld electronic device 102 and may provide enhanced on-device functions, communication-related functions, or both. For example, secure communication applications may enable electronic commerce functions and other such financial transactions to be performed using the handheld electronic device 102.

The handheld electronic device 102 may include a personal information manager (PIM) application having the ability to organize and manage data items relating to a user such as, but not limited to, instant messaging, email, calendar events, voice mails, appointments, and task items. The PIM application has the ability to send and receive data items via the wireless network 204. In some example embodiments, PIM data items are seamlessly combined, synchronized, and updated via the wireless network 204, with the user's corresponding data items stored and/or associated with the user's host computer system, thereby creating a mirrored host computer with respect to these data items.

The handheld electronic device 102 may provide two principal modes of communication: a data communication mode and an optional voice communication mode. In the data communication mode, a received data signal such as a text message, an email message, or Web page download will be processed by the communication subsystem 211 and input to the microprocessor 240 for further processing. For example, a downloaded Web page may be further processed by a browser application or an email message may be processed by an email message application and output to the display 104. A user of the handheld electronic device 102 may also compose data items, such as email messages, for example, using the input device 206 in conjunction with the display device 104 and possibly the auxiliary I/O device 250. These composed items may be transmitted through the communication subsystem 211 over the wireless network 204.

In the voice communication mode, the handheld electronic device 102 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the handheld electronic device 102. Although voice or audio signal output is typically accomplished primarily through the speaker 256, the display device 104 may also be used to provide an indication of the identity of a calling party, duration of a voice call, or other voice call related information.

Gesture-Based Control

Figure 4:
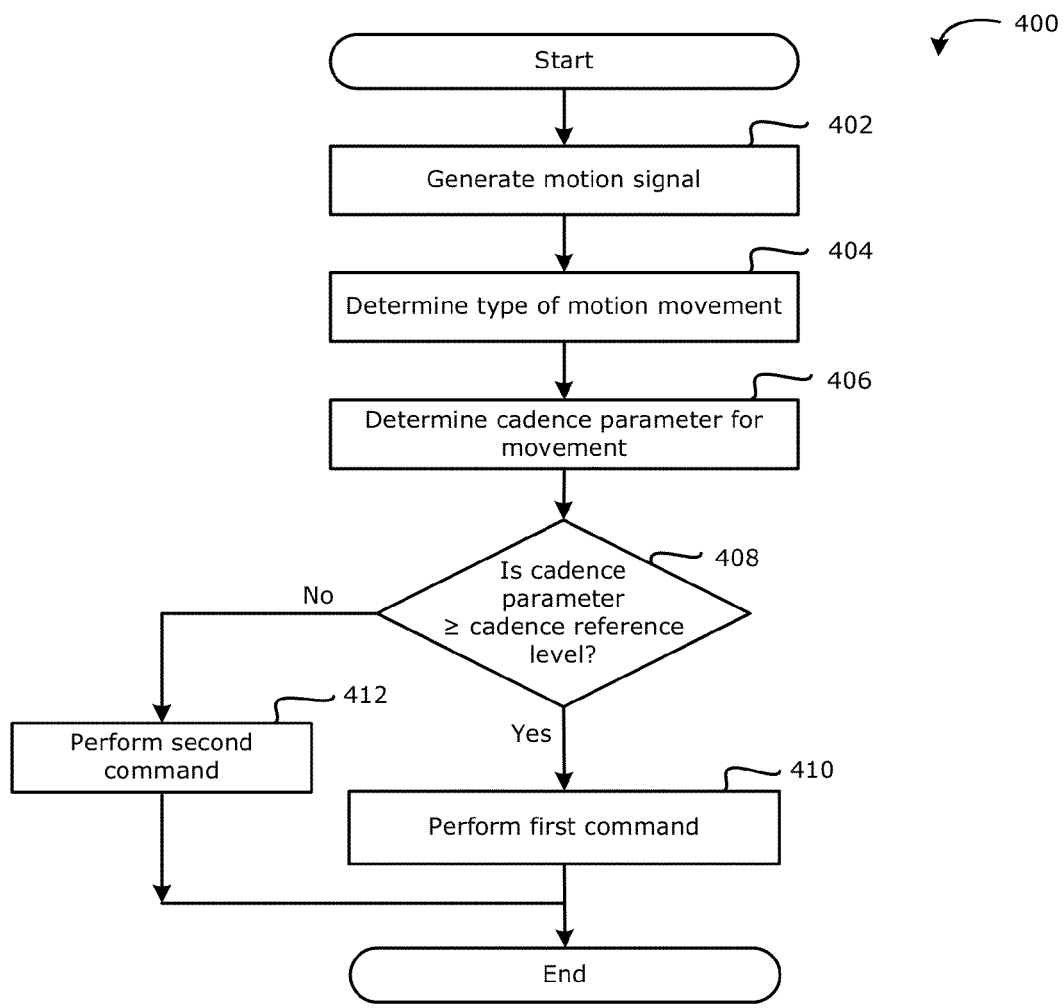
FIG. 4 is a flowchart illustrating example operations for gesture-based control of a handheld electronic device in accordance with one embodiment of the present disclosure.

Referring now to FIG. 4, an example method for gesture-based control in accordance with one example embodiment of the present disclosure will be described. The operations 400 of the method are carried out by the controller of the device 102 under the instruction of the command interpreter 274 and/or an application 225 such as the media player 270. The command interpreter 274 could be a separate module 221, or part of the operating system or application 225 such as the media player 270 or other module 221. Depending on the embodiment, the command interpreter 274 may pass its result of to an active application on the device 102, which could be the media player 270 in some embodiments, for further processing. The command interpreter 274 may be limited to selected applications on the device 102 or may be available to all of the applications 225. In some embodiments, the recognition of gesture-based commands may be enabled or disabled by device settings, application-specific settings or corresponding input to enable or disable the command interpreter 274. In some embodiments, a button may be depressed or held to enable/disable gesture-based command recognition.

In the first step 402, motion signals are generated by the motion detection subsystem 249 in response to the movement of the handheld electronic device 102. In embodiments in which the motion detection subsystem 249 includes an accelerometer 310, the motion signals are accelerometer measurements indicating the acceleration of the handheld electronic device 102. In a gesture-control mode, the command interpreter 274 monitors for and detects motion signals generated by the motion detection subsystem 249.

Next, in optional step 404 the command interpreter 274 analyzes the motion signals to determine the type of movement of the handheld electronic device 102 from one or more predetermined types of movement. In some embodiments, determining the type of movement comprises comparing the acceleration measured by the accelerometer 310 to predetermined patterns of accelerometer measurements or reference signals to determine whether it is characteristic of one or more predetermined types of movement. In some embodiments, the command interpreter 274 is configured to recognize a shaking movement such as back-and-forth or side-to-side movement, a movement in substantially one direction, or both. The shaking movement may be characterized by the accelerometer measurements 500 of FIG. 5. The movement in substantially one direction may be characterized by the accelerometer measurements of FIG. 11. It will be appreciated by a person skilled in the art that other patterns of movement and other methods of recognizing patterns of movement are also possible. In other embodiments, the type of movement of the handheld electronic device 102 is not determined and the accelerometer measurements are used to determined one or more cadence parameters irrespective of the type of movement.

Figure 11:
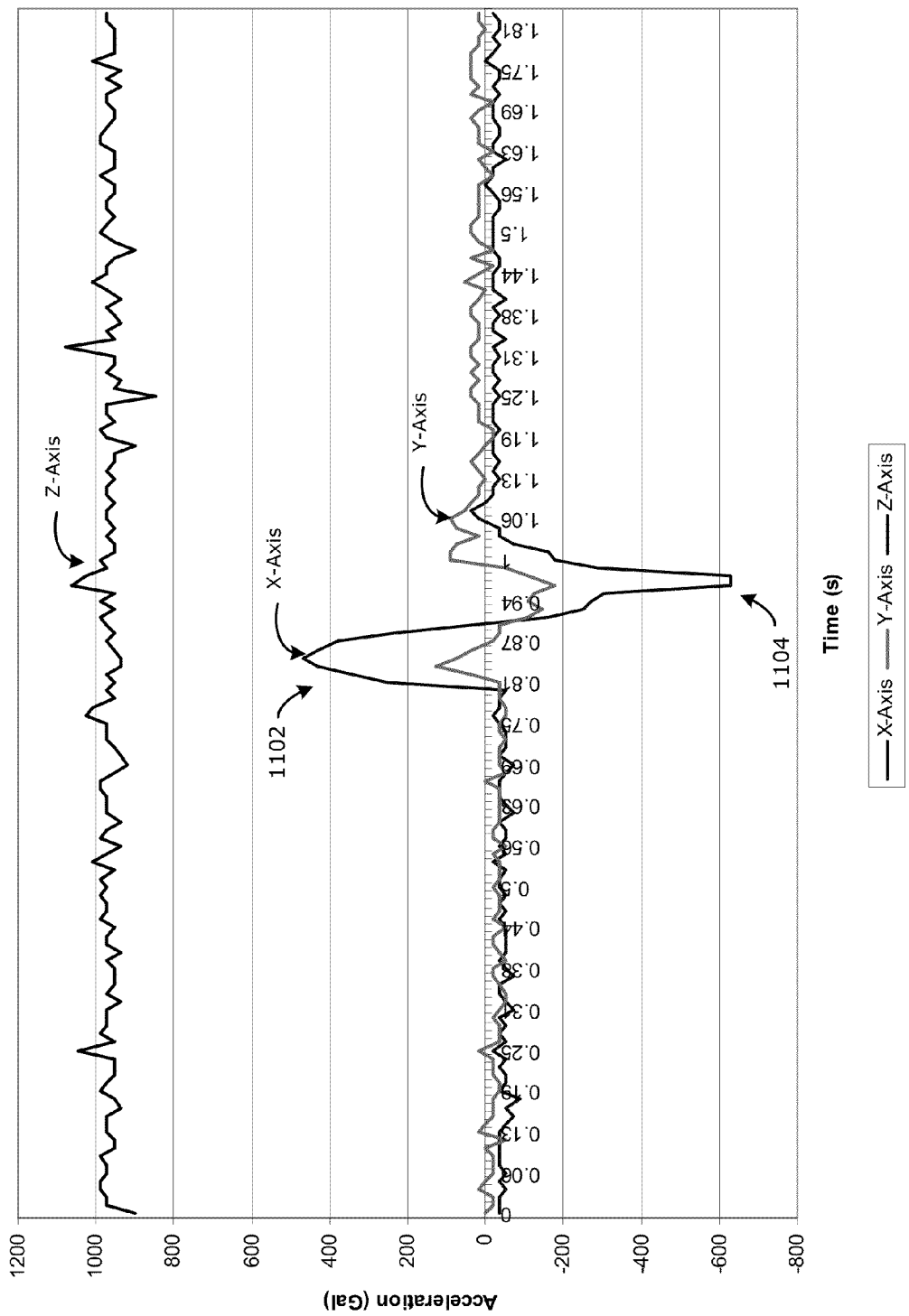
FIG. 11 is a graph illustrating example accelerometer measurements for movement of the handheld electronic device of FIG. 1 along the x-axis in a generally straight line along the x-axis.

The command interpreter 274 determines the type of movement of the device 102 by comparing the pattern of accelerometer measurements to predetermined patterns of accelerometer measurements. The example measurements of FIG. 11 illustrate a movement in substantially one direction. The accelerometer measurements of FIG. 11 include a period of relatively constant acceleration on all sensing axes followed by a sharp increase in acceleration referred to as a spike 1102. The first spike 1102 is then followed immediately or shortly thereafter by a sharp decrease in acceleration to a second spike 1104 having a sign opposite to the first spike 1102 (negative from positive in FIG. 11) which is followed again by a second period of relatively constant acceleration. When the spikes 1102 and 1104 occur on only one of sensing axes as in FIG. 11 (the x-axis), this indicates that the movement occurred in a direction substantially parallel to the respective sensing axis. In contrast, a shaking movement is characterized by a series of alternating increase and decreases in acceleration as in the example measurements of FIG. 5.

In some embodiments, the accelerometer 310 reports three voltage signals corresponding to the acceleration detected along each sensing axis to the command interpreter 274. The output signals of the accelerometer 310 are then compared to predetermined patterns of accelerometer measurements or reference accelerometer output signals ("reference signals") for each sensing axis which are characteristic of the accelerometer response to the one or more predetermined types of movement. If the output signals are within a predetermined variance of the predetermined patterns of accelerometer measurement of particular movement type, the command interpreter 274 detects that movement type. The predetermined variance may comprise one or more predetermined parameters describing features of the accelerometer output signals. The comparison of the acceleration measurements of the accelerometer 310 to the reference signals is a matter of digital signal processing which would be understood a person skilled in the art. However, examples will be described below for the purpose of illustration.

In other embodiments, the accelerometer 310 reports a single multiplexed signal corresponding to the acceleration detected along each sensing axis. The multiplexing may be performed by the accelerometer 310 or the processor 240 in accordance with the instructions of the operating system 223 or command interpreter 274. In yet other embodiments, the accelerometer 310 under the instruction of its onboard software could monitors for and detects the one or more predetermined types of movement in the same or a similar manner as described above, and sends a corresponding interrupt signal to the processor 240 via a corresponding interrupt port or interface. The receipt of this interrupt signal by the processor 240 is interpreted by the command interpreter 274 or operating system 223 as the detection of a particular one or more predetermined types of movement. The command interpreter 274 may monitor for and detect such interrupt signals, raw output signal(s) from the accelerometer 310, or both.

Next, at step 406 the command interpreter 274 determines one or more cadence parameters associated with the movement of the electronic device 102 in accordance with the motion signal. The cadence parameters may be a rhythm defined by the detected movement or other secondary indication or measure of the rate of the detected movement, or any combination thereof. The cadence parameter may be an average duration of a period of a repetitive movement (e.g. shaking movement). As will be discussed in more detail below, various methods may be used to determine the one or more cadence parameters. When the movement is a repetitive movement such as a shaking movement, the cadence parameter may be an average duration of a period of the repetitive movement.

Next, in step 408 the cadence parameter is compared with a cadence reference level to determine an associated gesture-based command. The command interpreter 274 determines whether the cadence parameter is greater than or equal to the cadence reference level. In some embodiments, a first command is performed when the cadence parameter is greater than or equal to the cadence reference level (step 410) and a second command is performed when the cadence parameter is less than the cadence reference level (step 412). In other embodiments, two or more cadence reference levels may be used. The cadence reference levels are predetermined thresholds which define cadence ranges associated with respective commands. The cadence reference level(s) is stored in the memory of the device 102. It will be appreciated that, where the type of movement is considered, the applicable cadence parameters depend on the type of movement.

In some embodiments, the cadence parameter is a rate of movement, and the command interpreter 274 determines the movement to be a fast movement when the cadence parameter is greater than or equal to the cadence reference level, and a slow movement when the cadence parameter is less than the cadence reference level. In such embodiments, the first command may be to increase the rate at which a rate dependent action is performed, and wherein the second command may be to decrease the rate at which the rate dependent action is performed. In some embodiments, the rate dependent action is the reproduction of media 229 having a time component on the handheld electronic device. The media 229 may be audio, video or a slideshow comprised of a series of digital images or graphics, or other visual content and optionally an audio soundtrack or sound effects. In some embodiments, the first command is to increase a rate of reproduction of the media 229 and the second command is to decrease the rate of reproduction of the media 229.

By way of example and not limitation, the media 229 may be video in the VCD, SVCD, DVD, Blu-ray™, MPEG or AVI video format, audio in the MP3, WMA or WAV format, or a series of digital images in the GIF, JPEG, PNG, TIFF or BMP format, or a slideshow in the PowerPoint™ format (PowerPoint is trade-mark of Microsoft Corporation). Other video, audio, image and slideshow formats could be used. The media 229 may be stored in the memory of the device 102, for example, in the flash memory 244. It will be appreciated that the media may be stored in other types of memory such as a hard disk drive (not shown). In other embodiments, the media 229 could be streamed from a remote storage location such as a remote content server.

The media player 270 permits the reproduction of the media to be controlled by the user, for example, a user may be permitted to commence playback (i.e., reproduction), pause playback or stop playback of a selected media, for example, from a playlist of the media player 270. The media player 270 may also permit the user to reverse playback of currently playing media to an earlier portion, or fast-forward (advance) playback of currently playing media to a later portion. The media player 270 may also permit the user to commence playback of a previous media (e.g., audio track) in a playlist of the media player 270, or commence playback of a next media (e.g., audio track) in a playlist of the media player 270. These and other commands of media player applications will be understood to persons skilled in the art.

In some embodiments, the command interpreter 274 may determine the difference between the cadence parameter and the cadence reference level, and varying the rate of reproduction by an amount proportional to the difference between the cadence parameter and the cadence reference level.

As noted above, in some embodiments the two or more cadence reference levels may be used. The two or more cadence reference levels comprise at least a first cadence reference level and a second cadence reference level which is higher than the first cadence reference level. The command interpreter 274 compares the cadence parameter with the two cadence reference levels. When the cadence parameter is greater than or equal to the second cadence reference level, a first command is performed. When the cadence parameter is greater than or equal to the first cadence reference level but less than the second cadence reference level, a second command is performed. When the cadence parameter is less than the first cadence reference level, a third command is performed. In some embodiments, the first command is to increase a rate of reproduction of the media 229, the second command is to return the rate of reproduction of the media 229 to a default rate (e.g., a standard reproduction rate), and the third command is to decrease the rate of reproduction of the media 229.

In yet other embodiments, a command is performed when the cadence parameter is greater than or equal to the cadence reference level. However, when the cadence parameter is less than the cadence reference level no command is a performed.

In some embodiments, the cadence parameters and the cadence reference levels which are used by the command interpreter 274 are set in accordance with the active application, which may be the media player 270. The cadence parameters and cadence reference levels may be configurable in some embodiments. For example, when an application becomes the active application on the device 102 and gesture-based control is to be used as determined by device settings, application-specific settings or user input to initiate the gesture-based control mode, the respective cadence parameters and cadence reference levels may be selected by the command interpreter 274 in accordance with the active application 225. The result of the command interpreter 274, that is the command selection, may then be passed to application for execution by the active application, for example, the media player 270. In other embodiments, the operations could be performed entirely by the active application rather than the command interpreter 274. In such cases, the command interpreter 274 may be part of the respective application 225.

The commands may include a command to increase the rate of reproduction of the media 229, a command to decrease the rate of reproduction of the media 229, or a command to return the rate of reproduction of the media 229 to a predetermined rate of reproduction or "speed" (e.g., a default rate). The predetermined rate may represent a standard rate for the playback of the media 229. Where the media 229 is audio or video, the predetermined rate may represent the rate at which the media was originally recorded.

In foregoing description, command selection is dependent on both the type of movement and the cadence of that movement. In other embodiments, the command selection could be based on a cadence parameter determined from the motion signal irrespective of the type of movement. In such embodiments, the cadence parameters are applicable across different types of movement. In yet other embodiments, the command selection could be based on the type of movement irrespective of its cadence. By way of example, a relatively fast shaking movement along a general axis which is substantially parallel to a first predetermined one of the sensing axes (e.g., the x axis) may be associated with a first command, a relatively fast shaking movement along a general axis which is substantially parallel to a second predetermined one of the sensing axes (e.g., the y-axis) may be associated with a second command, a relatively slow shaking movement along the first predetermined sensing axis (the x-axis) may be associated with a third command, and a relatively slow shaking movement along the second predetermined sensing axis (the y-axis) may be associated with a fourth command. Accordingly, the command interpreter 274 may consider type of movement, the capable of the movement, or both in selecting a command depending on the embodiment.

While the operations 600 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The command interpreter 274 interprets predetermined various motions or gestures detected by the motion detection system 249 as input. These gesture-based inputs are associated with corresponding logical inputs or commands by the operating system 223 or an application 225, depending on the context and the active application. The commands could be any command or instruction such as, for example, an instruction to launch a particular software application 225, or an instruction for an active application to perform a specific action or function. In some embodiments, the commands have an associated cadence or timing parameter. This allows the cadence of the movement to be matched with a command in accordance with a logical or intuitive relationship between the cadence of the movement (e.g., rate or "speed" of movement of the device 102) and the cadence of the command (e.g., timing parameter). For example, audio and video playback by the media player 270, photo slideshows by the media player 270, audio playback by the telephone application or voicemail application, and text-to-speech applications each have a rate of reproduction or delivery. In some embodiments, faster movement of the device 102 (possibly a movement of a predetermined type such as shaking or other repetitive movement) is interpreted by the command interpreter 274 to increase the reproduction.

Gestures-based controls based on predetermined movements of the device 102 provide a mechanism for convenient cadence adjustment whereby the user can control the rate of reproduction of time-based media such as audio, video and slideshows. This avoids the inconvenience of pressing mechanical keys or buttons, or interacting with virtual keys, buttons or other interface elements of touchscreen to increase or decrease the cadence of the application, especially in the context of media reproduction on the device 102. This interface may be particularly complicated or intrusive to the user experience during a video playback, a photo slideshow or other application having a visual playback component where the display screen 204 will be obscured to some extent by the controlling interface. Gesture-based controls may be more intuitive for the device user making it more convenient and easy to use, faster, and avoids obscuring the display screen 204. The gestures-based controls are particularly advantageous when the device 102 takes the form of a handheld electronic device such as a smartphone. Smaller devices such as handheld electronic devices have less space for control buttons and keys compared with desktop and notebook computers. Accordingly, input mechanisms on smaller devices are often themselves smaller than on larger devices. Touchscreen-based handheld electronic devices typically have a limited number of physical control buttons, or none at all, in favour of touchscreen-based user interface controls which may include virtual buttons. During playback of media on such devices, it may be desirable to utilize as much of the display screen 204 as possible during the playback of the media 229 so as to minimize or eliminate the space allocated to onscreen control elements.

An example use case of media reproduction will now be described. The playback of a slideshow is started on the device 102 in which a series of slides which comprises digital images, graphics or other visual components are displayed on the displayed on the screen 204. The slideshow is stated at a default or predefined rate of reproduction/playback. If the slideshow is moving to slowly or is displayed a series of visual components which have already been viewed, the user can make a predetermined control movement to increase the rate of reproduction of the slideshow, for example, while holding the device 102 in his or her hand. In the context of a slideshow, this means that slides will be shown for shorter durations and more slides will be shown over a given duration. Typical, the increased rate of reproduction will be maintained in the absence of any further input to change the rate of reproduction. However, in other embodiments, the rate of reproduction may return to a default rate of reproduction after a predetermined duration at the increase rate of reproduction. The predetermined duration could be 5 seconds, 10 seconds, or another suitable duration. The predetermined duration could be configurable in some embodiments.

When the slideshow is moving to fast, for example, when a more interesting or new portion of the slideshow is being shown, the user can make a predetermined control movement to decrease the rate of production of the slideshow. In the context of a slideshow, this means that slides will be shown for longer durations and fewer slides will be shown over a given duration. Typically, the decrease rate of reproduction will be maintained in the absence of any further input to change the rate of reproduction.

Media reproduction using gesture-based control on other applications 225 would work in a similar manner to slideshows described above.

In other embodiments, a speed of the detected movement rather than a cadence parameter may be determined and used to select inputs using the command interpreter 274. For example, a linear speed of the handheld electronic device 102 may be determined from the acceleration measurements and used to select an input based on whether the detected speed is greater than a reference speed. The linear speed and reference speed could be measured in terms of meters per second (m/s). The linear speed could be determined for different types of movements.

Example Accelerometer Measurement Analysis

Figure 5:
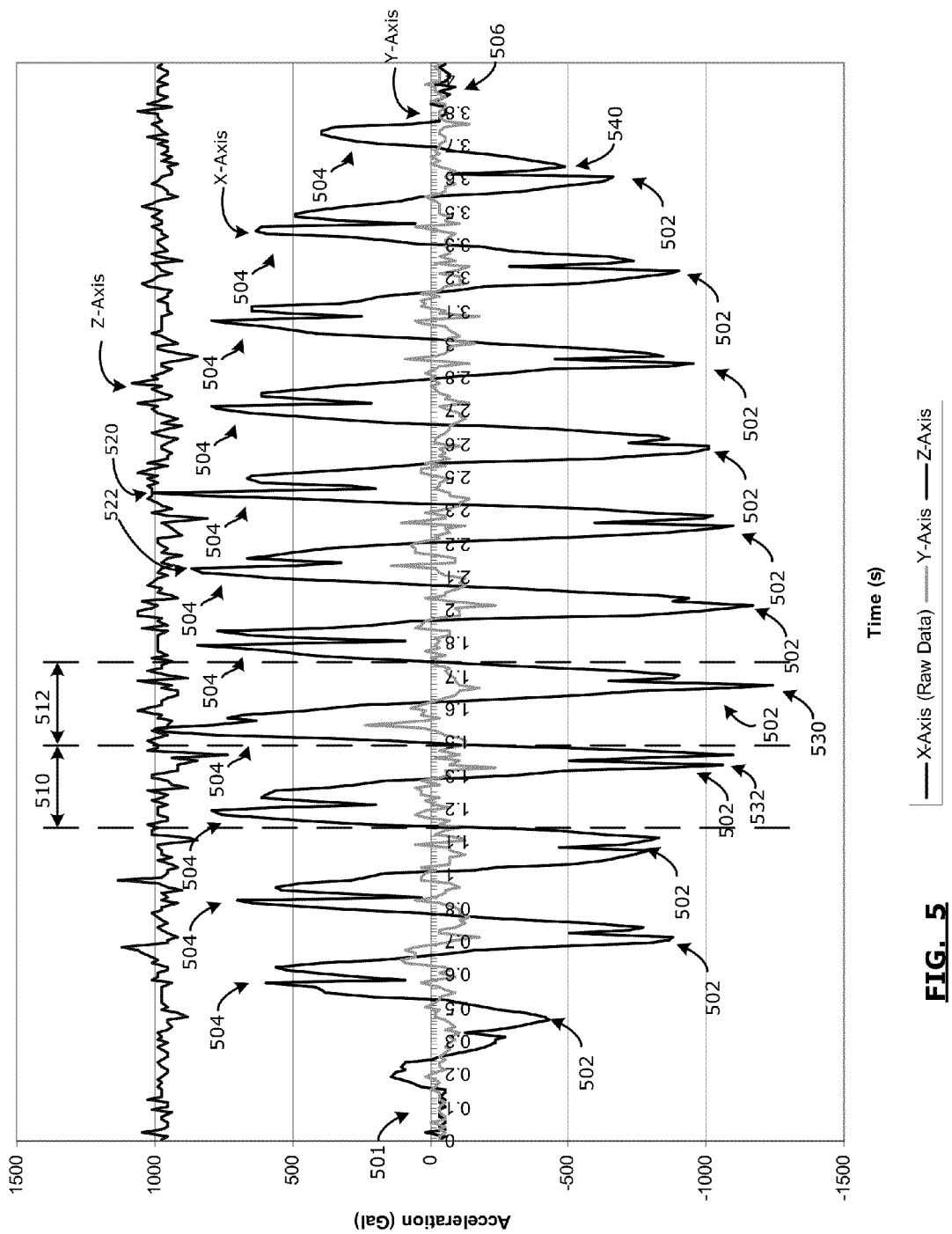
FIG. 5 is a graph illustrating example accelerometer measurements for a period of relatively fast shaking of the handheld electronic device of FIG. 1 along the x-axis.

Referring now to FIG. 5, example accelerometer measurements 500 during a period of relatively fast lateral shaking of the handheld electronic device 102 along the x-axis are shown. The measurements 500 are shown in Gal over a time duration measured in seconds and are taken using each of the three sensing axes (i.e., x, y and z axes) of a three axes accelerometer 310. The start of the measurements were taken when the electronic device 102 was not moving significant or was still, and the measurements represent a period 501 of relative stability. Because the accelerometer measurements of FIG. 5 represent a lateral shaking motion of the electronic device 102 along the x-axis, the accelerometer measurements 500 from y-axis and the z-axis are relatively stable. The accelerometer measurements 500 also illustrate that the z-axis was substantially parallel to gravity during the shaking movement as it experiences a force of acceleration of approximately 980 Gal (9.8 m/s$^2$).

The shaking movement illustrated in FIG. 5 is characterized by accelerometer measurements 500 on the x-axis which alternate between positive acceleration spikes 504 and negative acceleration spikes 502. In the positive acceleration spikes 504, the accelerometer measurements 500 along the x-axis increase from a general baseline measurement or reading in the period 501 prior to the shaking movement. Similarly, in the negative acceleration (e.g. deceleration) spikes 502, the accelerometer measurements 400 along the x-axis are decrease from the baseline in the period 501 prior to the shaking movement. In the example shown, prior to and during the shaking movement, the x-axis is generally perpendicular to the earth's gravitational force. In this orientation, the accelerometer measurements on the x-axis are approximately zero Gal when the device 102 is not since force of gravity acting on the y and z axes in this position is approximately zero. Accordingly, in the shown example shown, the positive acceleration periods 504 may be defined as the periods in which the accelerometer measurements 500 on the x-axis are greater than the baseline when the device 102 was not moving, and the negative acceleration periods 402 may be defined as the periods in which the accelerometer measurements 400 on the x-axis are less than baseline when the device 102 was not moving.

As described above, FIG. 11 illustrates accelerometer measurements for device movement in substantially one direction are shown. This pattern of movement is characterized by a period of stability or stillness of the device 102, following by movement of the device 102 in substantially one direction (for example, along the x-axis) in the positive direction, followed by a second period of stability or stillness of the device 102. This pattern of movement has accelerometer measurements characterized by a single acceleration spike 1102 as the device 102 accelerates followed immediately afterward by a single deceleration spike 1104 as the device 102 decelerates. During the measurements of FIG. 11, the device 102 was oriented in the same manner as during the shaking in the measurements 500 of FIG. 5. That is, the device 102 was oriented so that the z-axis is generally in parallel alignment with the force of gravity and the x-axis and y-axis are generally perpendicular to the force of gravity. Owing to this device orientation, the acceleration spike 1102 is characterized by accelerometer measurements on the x-axis which are substantially greater than 0 Gal and the single deceleration spike 1104 is characterized by accelerometer measurements on the x-axis substantially less than 0 Gal. These results are similar to the acceleration spikes and deceleration spikes in the measurements 500 of FIG. 5 over one interval.

Figure 6:
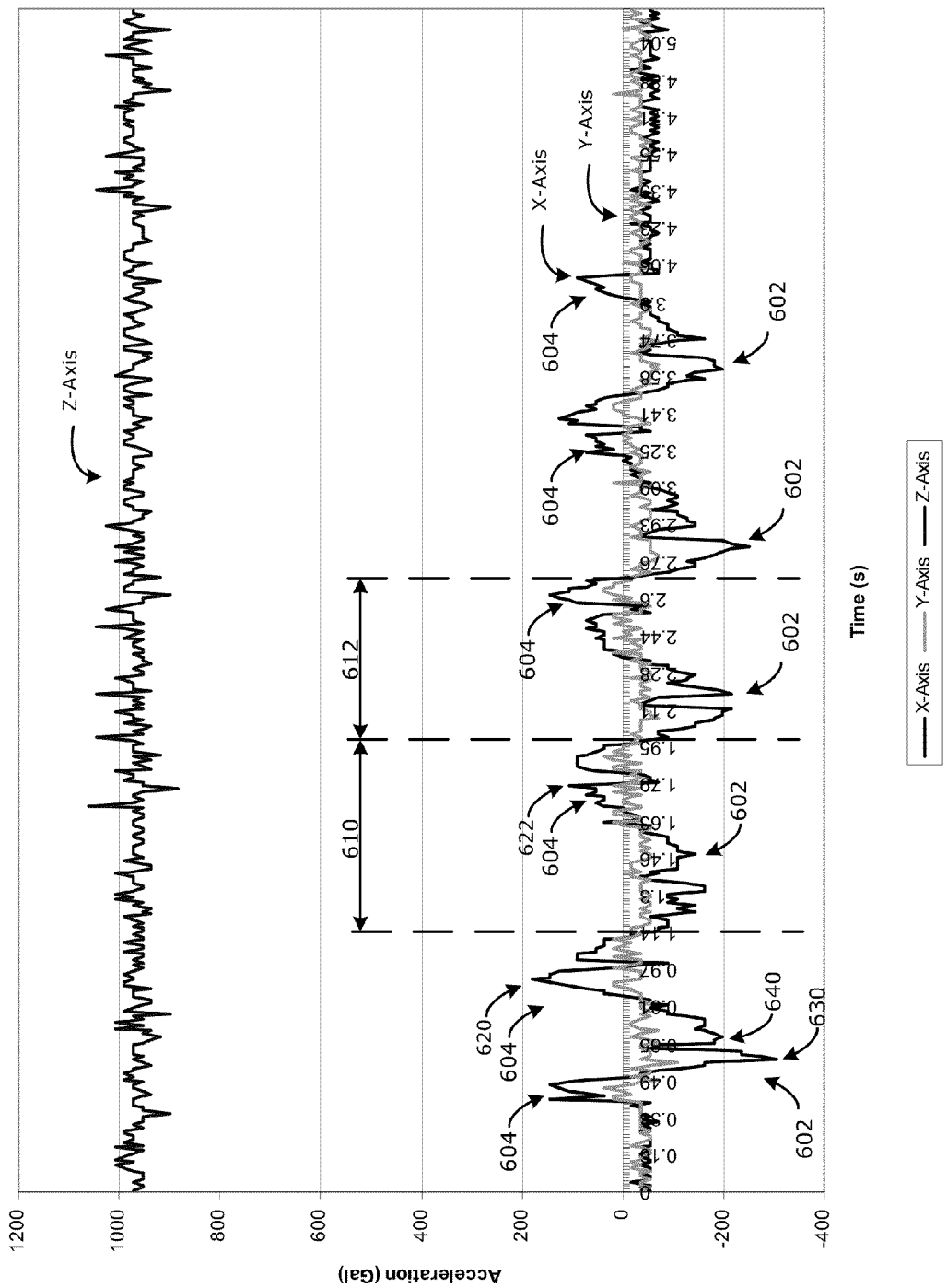
FIG. 6 is a graph illustrating example accelerometer measurements for a period of relatively slow shaking of the handheld electronic device of FIG. 1 along the x-axis.

Referring now to FIG. 6, a graph illustrating example measurements from the accelerometer 310 in the device 102 is shown. The accelerometer measurements 600 in FIG. 6 illustrate the same general pattern as the accelerometer measurements 500 previously referred to in FIG. 5. That is, both represent a lateral shaking motion which is characterized by numerous sequential alternating positive acceleration spikes 504, 604 and negative acceleration spikes 502, 602. However, the accelerometer measurements 600 of FIG. 6 are different in that the measurements were taken when the electronic device 102 was moving more slowly than in the measurements 500 of FIG. 5. Referring to FIGS. 5 and 6, it can be seen that a number of characteristics can be used to relate the accelerometer measurements (i.e. acceleration) to a cadence of the movement (for example, a rate of "speed" of movement). For example, if it is assumed that a user moves the device 102 approximately the same distance during a fast movement as during a slow movement, a period 510, 610 of the accelerometer measurements obtained during the movement may be used to quantify the cadence of the movement of the device 102. That is, during relatively slow movement of the device 102, the period 610 of the accelerometer measurements is typically longer than the period of the accelerometer measurements during a period of relatively fast movement of the device 102.

From the accelerometer measurements 500, 600, a period 510, 610 can be determined. The period 510, 610 may be determined using known digital signal analysis techniques, and could be the duration between the sequential peaks of the positive acceleration spikes 504, 604 or negative acceleration spikes 502, 602 of the accelerometer measurements 500, 600. Other periodic events in the accelerometer measurements 500, 600 could be used to define the period in other embodiments. For greater accuracy, when the period of a repetitive movement such as shaking is used as a cadence parameter, the period may be the average duration over two or more periods, for example the average over successive periods 510 and 512 or 610 and 612.

It may also be seen from FIGS. 5 and 6 that the maximum value 620 of accelerometer measurements during relatively slow movement of the electronic device 102 may tend to be lower than the maximum value 520 of accelerometer measurements during relatively fast movement of the electronic device 102. Accordingly, in some embodiments the one or more cadence parameters may comprise the maximum accelerometer measurement such as at points 520, 620 of accelerometer measurements over the detected movement of the device 102, or the average of two or more local maximum accelerometer measurements such as at points 520 and 522 or points 620 and 622.

It will also be appreciated that the minimum value 630 of accelerometer measurements 600 obtained during a period of relatively slow movement may tend to be higher than the minimum value 530 of accelerometer measurements 500 obtained during a period of relatively fast movement. Accordingly in some embodiments the one or more cadence parameters may comprise the minimum accelerometer measurement such as at points 520, 620 of accelerometer measurements over the detected movement of the device 102, or the average of two or more local minimum accelerometer measurements such as at points 530 and 532 or points 630 and 632.

It will also be appreciated that, in some embodiments, the accelerometer measurements may contain outlying measurements which make it more difficult to recognize the pattern of the accelerometer measurements or determine the measure of the rate of movement. Outlier measurements are measurements which tend to deviate from the general pattern. Various signal processing techniques may be employed to facilitate the interpretation of the data in spite of these outlier measurements. Typically, these outlier measurements occur at a high frequency. Accordingly, they may be filtered out using standard filtering or smoothing techniques. By way of example, in some embodiments a smoothing function may be employed in which the value at each point is determined as the average of the accelerometer measurement at that point and one or more previous and/or subsequent accelerometer measurements.

Figure 7:
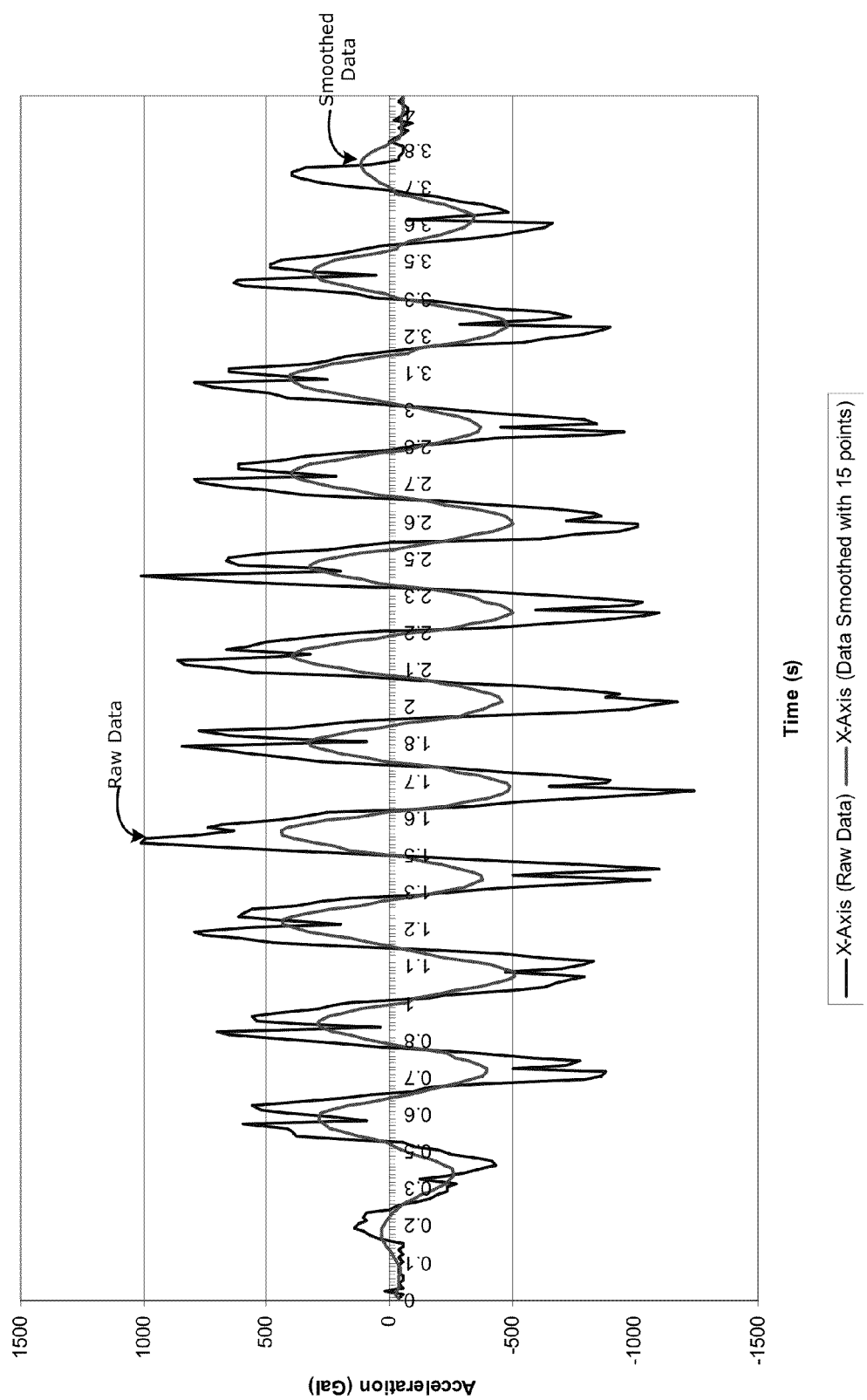
FIG. 7 is a graph illustrating the result of applying a smoothing function to accelerometer measurements for a period of relatively fast shaking of the handheld electronic device of FIG. 1 along the x-axis.
Figure 8:
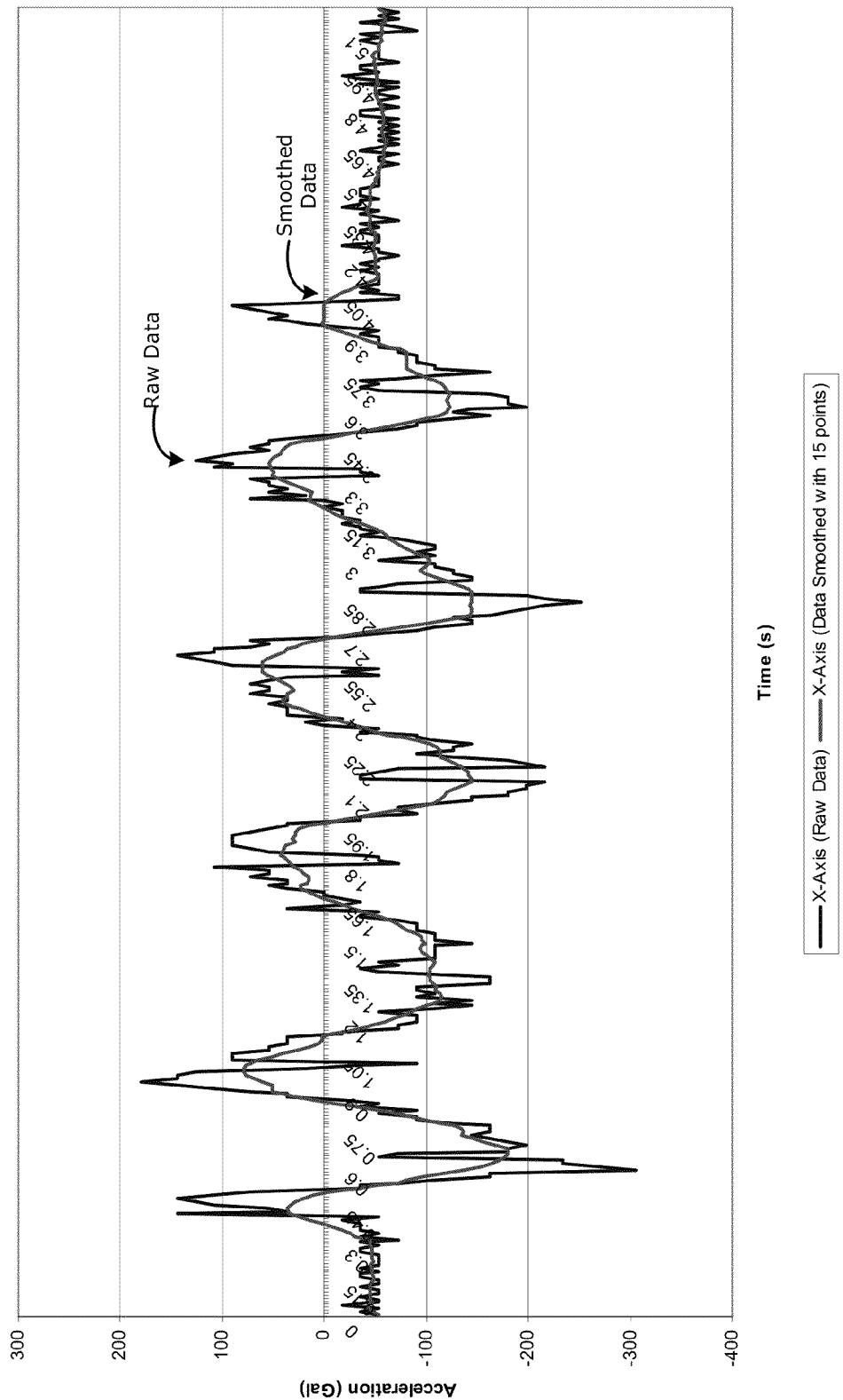
FIG. 8 is a graph illustrating the result of applying a smoothing function to accelerometer measurements for a period of relatively slow shaking of the handheld electronic device of FIG. 1 along the x-axis.

FIG. 7 illustrate example accelerometer measurements taken during relatively fast shaking movement along the x-axis along with smoothed/filtered acceleration values generated by averaging an accelerometer measurement with seven (7) prior accelerometer measurements and seven (7) subsequent accelerometer measurements. FIG. 8 shows example accelerometer measurements and smoothed/filtered acceleration values for relatively slow shaking movement along the x-axis. As may be seen from FIG. 7 and FIG. 8, this smoothing function reduces the effect of outliers, thereby facilitating interpretation of the data by the command interpreter 274. Accordingly, in at least some embodiments, the command interpreter 274 may employ signal processing techniques to minimize the effect of outliers when analyzing the motion signals and determining the type of movement of the handheld electronic device 102 from one or more predetermined types of movement in step 404, and when determining one or more cadence parameters associated with the type of movement of the electronic device 102 in step 406.

It will also be appreciated that, while the embodiments discussed above have made reference to situations in which the movement of the electronic device 102 moves in a single direction along one of the sensing axes, the detectable movements need not be so restricted in some embodiments. To accommodate the freedom of movement of the device 102, the command interpreter 274 may be configured to calculate the total magnitude of the acceleration vector measured by the three sensing axes (i.e., the x, y, and z sensing axes) of the accelerometer 310. For example, the magnitude of acceleration of each accelerometer measurement may be calculated from the following equation:

$$\text{magnitude of acceleration} = \sqrt{x^2+y^2+z^2}$$

where x, y, and z are the accelerometer measurements from the x, y and z sensing axes respectively.

Figure 9:
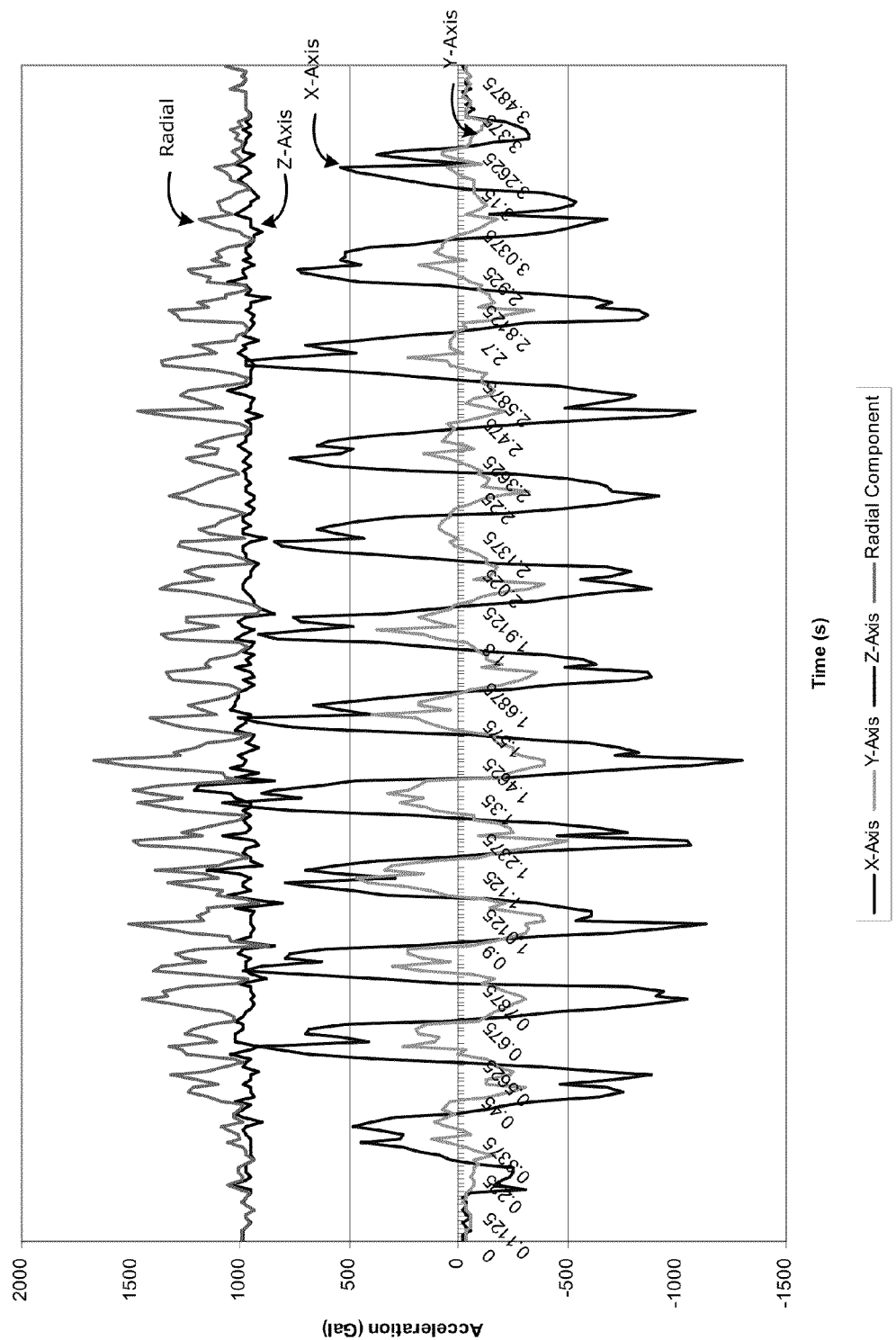
FIG. 9 is a graph illustrating the magnitude of the acceleration vector measured for a period of relatively fast shaking of the handheld electronic device of FIG. 1 along the x-axis.
Figure 10:
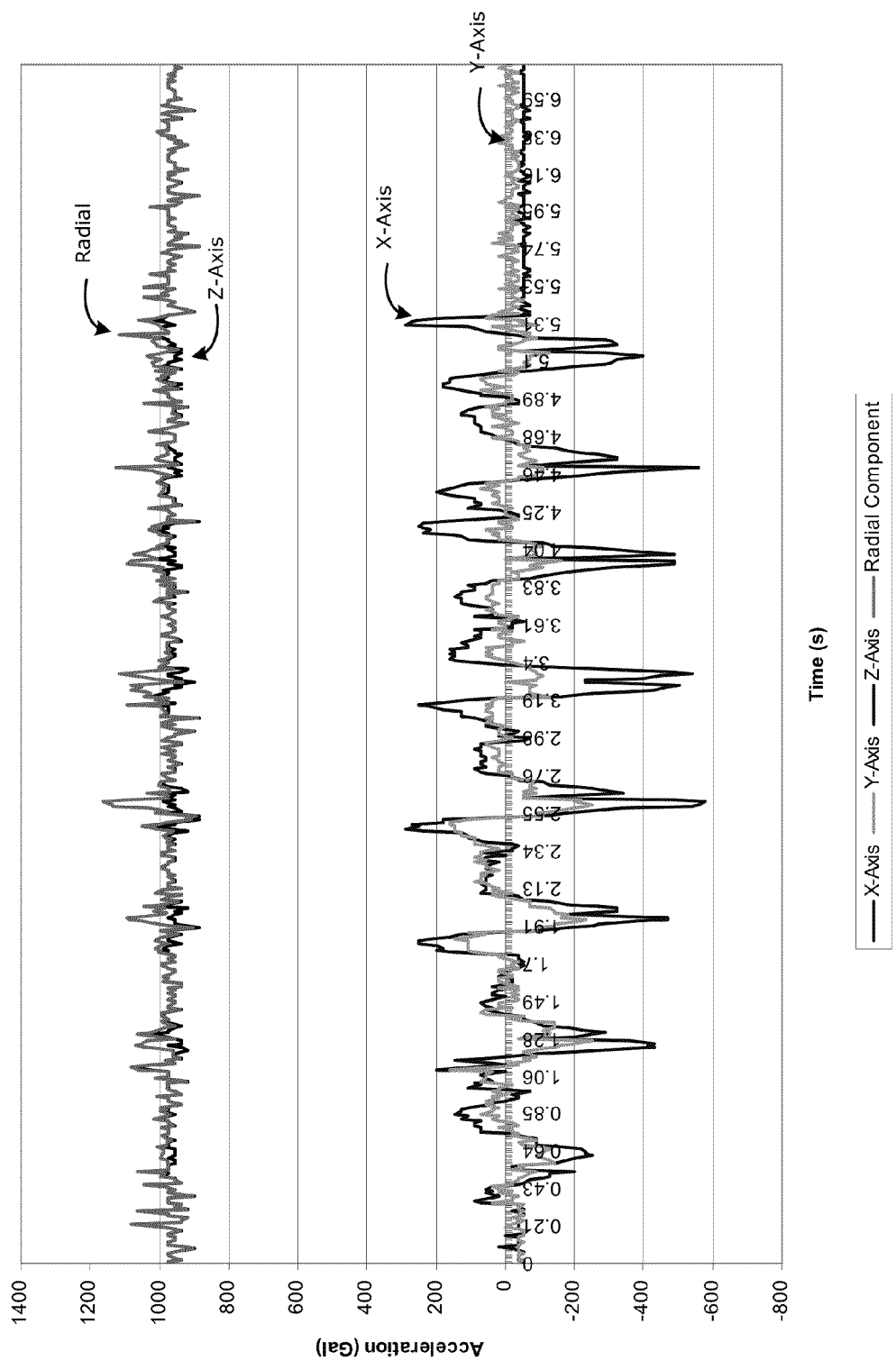
FIG. 10 is a graph illustrating the magnitude of the acceleration vector measured for a period of relatively slow shaking movement of the handheld electronic device of FIG. 1 along the x-axis.

Example accelerometer measurements 900, 1000 are shown in FIG. 9 and FIG. 10 for a relatively fast movement (FIG. 9) and a relatively slow movement (FIG. 10). In these graphs, the device movement is not restricted to movement parallel to (along) one sensing axis. In the illustrated graphs, acceleration is experienced along the x-axis and y-axis of accelerometer 310. From these graphs, it may be seen that the maximum value of the magnitude of acceleration for the relatively fast movement may tend to be larger than the maximum value of the magnitude of acceleration for the relatively slow movement. Accordingly, one or more cadence parameters may be calculated from a radial component of accelerometer measurements. In some embodiments, the one or more cadence parameters may comprise the maximum value of the radial component of the accelerometer measurements over the duration of the detection movement on all sensing axes. The radial component of the accelerometer measurements over the duration of the detected movement could be used in other embodiments.

While the foregoing description has largely been described in the context of individual motion signals, it will be appreciated that the teachings of the present disclosure are equally applicable to motion detection subsystems which generate a number of motion signals which describe a detected movement of the device. In such cases, the group of motions signals are analyzed in accordance with the motion data (e.g., acceleration data of the accelerometer) defined by the group(s) of signals in the same manner as described above for a single signal.

Communication Subsystem

Referring again to FIG. 2, the wireless communication subsystem 211 will now be described in further detail. Depending on the functionality provided by the handheld electronic device 102, in various embodiments the device may, for example, be a data communication device, a multiple-mode communication device configured for both data and voice communication, a smartphone, a mobile telephone or a PDA (personal digital assistant) enabled for wireless communication, or a computer system with a wireless modem.

The wireless communication subsystem 211 exchanges radio frequency signals with a wireless network 204 which may comprise one or more of a Wireless Wide Area Network (WWAN) and a Wireless Local Area Network (WLAN) or other suitable network arrangements. The wireless communication subsystem 211 may comprise a WWAN communication subsystem for two-way communication with the WWAN and a WLAN communication subsystem two-way communication with the WLAN. In some embodiments, the handheld electronic device 102 is configured to communicate over both the WWAN and WLAN, and to roam between these networks. In some embodiments, the wireless network 204 may comprise multiple WWANs and WLANs.

The WWAN may comprise a wireless network gateway (not shown) which connects the handheld electronic device 102 to the Internet, and through the Internet to a wireless connector system comprising a mobile data server (not shown). The mobile data server may be operated by an enterprise such as a corporation which allows access to a network such as an internal or enterprise network and its resources, or the mobile data server may be operated by a mobile network provider. If the mobile data server is operated by a mobile network service provider, the network may be the Internet rather than an internal or enterprise network.

The wireless network gateway provides translation and routing services between the mobile data server and the WWAN, which facilitates communication between the handheld electronic device 102 and other devices (not shown) connected, directly or indirectly, to the wireless network 204. Accordingly, communications sent via the handheld electronic device 102 are transported via the wireless network 204 to the wireless network gateway. The wireless gateway forwards the communications to the mobile data server via the Internet. Communications sent from the mobile data server are received by the wireless network gateway and transported via the wireless network to the handheld electronic device 102.

The WWAN may be implemented as a packet-based cellular network that includes a number of transceiver base stations (not shown). The WWAN may be implemented using any suitable network technology. By way of example, not limitation, the WWAN may be implemented as a packet-based wireless network that includes a number of transceiver base stations where each of the base stations provides wireless Radio Frequency (RF) coverage to a corresponding area or cell. The WWAN is typically operated by a mobile network service provider that provides subscription packages to users of the handheld electronic device 102. In some embodiments, the WWAN conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN is described as a "Wide-Area" network, that term is intended herein also to incorporate wireless Metropolitan Area Networks (WMAN) and other similar technologies for providing coordinated service wirelessly over an area larger than that covered by typical WLANs.

The WLAN 104 comprises a wireless network which, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) (not shown) that collectively provide a WLAN coverage area.

The WLAN may be a personal network of the user, an enterprise network, or a hotspot offered by an Internet service provider (ISP), a mobile network provider, or a property owner in a public or semi-public area, for example. The access points are connected to an access point (AP) interface which connects to the mobile data server directly (for example, if the access point is part of an enterprise WLAN in which the mobile data server resides), or indirectly via the Internet if the access point is a personal Wi-Fi network or Wi-Fi hotspot (in which case a mechanism for securely connecting to the mobile data server, such as a virtual private network (VPN), may be required). The AP interface provides translation and routing services between the access points and the mobile data server to facilitate communication, directly or indirectly, with the mobile data server.

It will be appreciated that the WWAN and WLAN may have coverage areas that overlap, at least partially. Typically, the coverage area of the WWAN will be much larger than the coverage area of the WLAN and may overlap all or a large percentage of the coverage area of the WLAN. The WLAN may have sole coverage in some regions that are dead spots in the WWAN. For example, some interior locations of an enterprise's buildings may be impenetrable to signals transmitted by the WWAN. Typically, the channel resources, such as bandwidth available for providing content to the handheld electronic device 102 will be greater over the WLAN than over the WWAN.

It will be appreciated that the above-described wireless network is provided for the purpose of illustration only, and that the above-described wireless network comprises one possible wireless network configuration of a multitude of possible configurations for use with the handheld electronic device 102. The different types of wireless networks 204 that may be implemented include, for example, data-centric wireless networks, voice-centric wireless networks, and dual-mode networks that can support both voice and data communications over the same physical base stations. New standards are still being defined, but it is believed that they will have similarities to the network behaviour described herein, and it will also be understood by persons skilled in the art that the embodiments described herein are intended to use any other suitable standards that are developed in the future.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the handheld electronic device 102 and a single antenna may be shared by both receiver and transmitter, as is known in the art. As will be apparent to those skilled in the field of communication, the particular design of the wireless communication subsystem 211 depends on the wireless network 101 in which handheld electronic device 102 is intended to operate.

The handheld electronic device 102 may communicate with any one of a plurality of fixed transceiver base stations (not shown) of the wireless network 101 within its geographic coverage area. The handheld electronic device 102 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method, comprising:
    determining from a motion signal a movement type associated with a movement of an electronic device from a number predetermined types of movement, the movement type being determined to be a repetitive movement;
    determining whether a cadence parameter is greater than or equal to a first cadence reference level, the cadence parameter being an average duration of a period between repetitive movements; and
    performing a first command when the cadence parameter is greater than or equal to the first cadence reference level.

2. The method of claim 1, wherein the repetitive movement comprises shaking in any direction, wherein when the cadence parameter equals or exceeds the first cadence reference level, a fast shaking repetitive movement is determined.

3. The method of claim 1, wherein the repetitive movement comprises shaking in a particular direction, wherein when the cadence parameter equals or exceeds the first cadence reference level, a fast shaking repetitive movement is determined.

4. The method of claim 1, wherein a second command is performed when the cadence parameter is greater than or equal to a second cadence reference level but less than the first cadence reference level, and a third command is performed when the cadence parameter is less than the second cadence reference level.

5. The method of claim 1, further comprising performing a second command when the cadence parameter is less than the first cadence reference level.

6. A method, comprising:
    determining, from a motion signal, when a repetitive movement of an electronic device has occurred;
    determining a cadence parameter associated with the repetitive movement, the cadence parameter being an average duration of a period between repetitive movements;
    performing a first command when the cadence parameter is greater than or equal to a first threshold; and
    performing a second command when the cadence parameter is less than the first threshold.

7. The method of claim 6, further comprising:
    performing a third command when the cadence parameter is greater than or equal to the first threshold but less than a second threshold higher than the first threshold.

8. The method of claim 6, wherein the repetitive movement comprises shaking in any direction.

9. The method of claim 6, wherein the repetitive movement comprises shaking in a particular direction.

10. A method, comprising:
    determining a rate of repetitive movement of an electronic device by determining an average duration of a period between repetitive movements;
    increasing a rate of reproduction of media when the rate of movement is greater than or equal to a first threshold; and
    decreasing the rate of reproduction of media when the rate of movement is less than the first threshold.

11. The method of claim 10, wherein the media is audio, video or a series of digital images.

12. The method of claim 10, further comprising:
    determining the difference between the rate of movement and the first threshold; and
    varying the rate of reproduction by an amount proportional to the difference between the rate of movement and the first threshold.

13. The method of claim 10, further comprising:
    returning the rate of reproduction of media to a default rate when the rate of movement is greater than or equal to the first threshold but less than a second threshold higher than the first threshold.

14. The method of claim 10, wherein the rate of movement is a rate of shaking the electronic device in any direction.

15. The method of claim 10, wherein the rate of movement is a rate of shaking the electronic device in a particular direction.

* * * * *